(12) United States Patent
Paria

(10) Patent No.: US 10,085,206 B2
(45) Date of Patent: Sep. 25, 2018

(54) METHODS AND SYSTEMS FOR OPTIMIZATION OF CELL SELECTION IN TD-SCDMA NETWORKS

(71) Applicant: Wipro Limited, Bangalore (IN)

(72) Inventor: Niladri Shekhar Paria, Bangalore (IN)

(73) Assignee: Wipro Limited, Bangalore (IN)

( * ) Notice: Subject to any disclaimer, the term of this patent is extended or adjusted under 35 U.S.C. 154(b) by 148 days.

(21) Appl. No.: 15/075,521

(22) Filed: Mar. 21, 2016

(65) Prior Publication Data

US 2017/0265204 A1 Sep. 14, 2017

(30) Foreign Application Priority Data

Mar. 8, 2016 (IN) .............................. 201641008087

(51) Int. Cl.
*H04W 48/20* (2009.01)
*H04W 24/04* (2009.01)
(52) U.S. Cl.
CPC ............ *H04W 48/20* (2013.01); *H04W 24/04* (2013.01)
(58) Field of Classification Search
CPC .................................................. H04W 72/085
See application file for complete search history.

(56) References Cited

U.S. PATENT DOCUMENTS

| | | | | |
|---|---|---|---|---|
| 8,111,709 B2* | 2/2012 | Hunukumbure | ..... | H04B 7/0413 370/437 |
| 8,175,601 B2* | 5/2012 | Engstrom | ............ | H04J 11/0093 370/331 |
| 8,364,158 B2* | 1/2013 | Deng | ..................... | H04W 60/00 455/435.2 |
| 8,411,555 B2 | 4/2013 | Kazmi | | |
| 8,971,893 B2* | 3/2015 | Li | ..................... | H04W 36/0061 455/417 |
| 9,226,301 B2* | 12/2015 | Yoshii | ................. | H04W 72/082 |
| 9,622,096 B2* | 4/2017 | Xia | ........................ | H04W 24/04 |
| 2008/0081626 A1* | 4/2008 | Choi | ..................... | H04B 7/155 455/442 |
| 2009/0092080 A1* | 4/2009 | Balasubramanian | ........................ | H04J 11/0093 370/328 |
| 2010/0317364 A1* | 12/2010 | Zhang | .................. | H04W 16/04 455/452.2 |

(Continued)

FOREIGN PATENT DOCUMENTS

WO WO 2012/136286 A1 10/2012

*Primary Examiner* — Parth Patel
(74) *Attorney, Agent, or Firm* — Finnegan, Henderson, Farabow, Garrett & Dunner LLP

(57) ABSTRACT

Methods and systems for optimization of cell selection in TD-SCDMA networks are disclosed. In an embodiment, the method includes detecting, by at least one processor, interference in a current serving cell employing a primary frequency and at least one secondary frequency used by a UE from at least one neighboring cell, wherein the interference is detected in the at least one secondary frequency of the current serving cell; including, by the at least one processor, the current serving cell in a defective cell list, wherein a signal strength associated with the primary frequency of the serving cell is greater than a signal strength associated with a neighboring primary frequency of the at least one neighboring cell; and excluding, by the at least one processor, each cell in the defective cell list from being selected as a new serving cell for the UE.

20 Claims, 5 Drawing Sheets

(56) References Cited

U.S. PATENT DOCUMENTS

| | | | | |
|---|---|---|---|---|
| 2011/0019596 A1* | 1/2011 | Li | H04W 72/08 | 370/281 |
| 2011/0110254 A1* | 5/2011 | Ji | H04W 36/0066 | 370/252 |
| 2011/0159880 A1* | 6/2011 | Kumar | H04W 76/028 | 455/450 |
| 2011/0207468 A1* | 8/2011 | Nakamura | H04W 52/0274 | 455/450 |
| 2011/0222484 A1* | 9/2011 | Pedersen | H04L 5/001 | 370/329 |
| 2012/0213095 A1* | 8/2012 | Krishnamurthy | H04L 5/001 | 370/252 |
| 2012/0213107 A1* | 8/2012 | Jang | H04W 24/10 | 370/252 |
| 2013/0022000 A1* | 1/2013 | Garcia | H04W 16/10 | 370/329 |
| 2013/0022026 A1* | 1/2013 | Ishii | H04L 5/001 | 370/332 |
| 2013/0028081 A1* | 1/2013 | Yang | H04W 48/20 | 370/230 |
| 2013/0150055 A1* | 6/2013 | Laroia | H04W 16/12 | 455/443 |
| 2013/0176952 A1* | 7/2013 | Shin | H04L 5/001 | 370/329 |
| 2013/0203417 A1* | 8/2013 | Ramachandran | H04W 36/06 | 455/436 |
| 2013/0260763 A1* | 10/2013 | Bhattad | H04W 36/0088 | 455/436 |
| 2013/0288694 A1* | 10/2013 | Mochizuki | H04W 72/04 | 455/450 |
| 2014/0086078 A1* | 3/2014 | Malladi | H04W 72/042 | 370/252 |
| 2014/0128074 A1* | 5/2014 | Vangala | H04W 36/22 | 455/436 |
| 2014/0254531 A1* | 9/2014 | Lee | H04L 5/006 | 370/329 |
| 2014/0307638 A1* | 10/2014 | Zacharias | H04L 5/0053 | 370/329 |
| 2014/0341059 A1* | 11/2014 | Jang | H04W 48/06 | 370/252 |
| 2015/0063182 A1* | 3/2015 | Wang | H04W 72/1215 | 370/311 |
| 2015/0063193 A1* | 3/2015 | Veerepalli | H04W 48/16 | 370/312 |
| 2015/0065138 A1* | 3/2015 | Chen | H04W 36/0094 | 455/436 |
| 2015/0092709 A1* | 4/2015 | Su | H04W 48/16 | 370/329 |
| 2015/0117399 A1* | 4/2015 | Yang | H04W 36/30 | 370/331 |
| 2015/0163686 A1* | 6/2015 | Zhang | H04W 24/08 | 370/252 |
| 2015/0181546 A1* | 6/2015 | Freda | H04W 56/0015 | 370/336 |
| 2015/0195852 A1* | 7/2015 | Xu | H04W 72/12 | 370/329 |
| 2015/0245361 A1* | 8/2015 | Hughes | H04W 72/082 | 455/450 |
| 2015/0249940 A1* | 9/2015 | Yang | H04W 36/04 | 455/436 |
| 2015/0296523 A1* | 10/2015 | Joshi | H04W 72/082 | 455/426.1 |
| 2015/0304056 A1* | 10/2015 | Guo | H04L 25/00 | 455/63.1 |
| 2015/0334574 A1* | 11/2015 | Krishnamoorthy | H04W 16/14 | 370/329 |
| 2015/0372778 A1* | 12/2015 | Xu | H04J 11/005 | 370/329 |
| 2016/0037523 A1* | 2/2016 | Wei | H04W 24/02 | 370/329 |
| 2016/0057688 A1* | 2/2016 | Koskinen | H04W 48/16 | 370/332 |
| 2016/0088496 A1* | 3/2016 | Takano | H04W 72/042 | 455/450 |
| 2016/0205605 A1* | 7/2016 | Krishnamurthy | H04W 36/20 | 455/553.1 |
| 2016/0234852 A1* | 8/2016 | Ko | H04L 5/0005 | |
| 2016/0286456 A1* | 9/2016 | Zingler | H04W 36/0083 | |
| 2017/0006623 A1* | 1/2017 | Lindoff | H04W 72/082 | |
| 2017/0094669 A1* | 3/2017 | Chandwani | H04W 72/082 | |
| 2017/0142632 A1* | 5/2017 | Panchal | H04W 36/38 | |
| 2017/0156091 A1* | 6/2017 | Wang | H04W 36/0072 | |
| 2017/0171790 A1* | 6/2017 | Wehinger | H04W 36/26 | |
| 2017/0245278 A1* | 8/2017 | Xue | H04W 72/0453 | |

* cited by examiner

METHODS AND SYSTEMS FOR OPTIMIZATION OF CELL SELECTION IN TD-SCDMA NETWORKS

TECHNICAL FIELD

This disclosure relates generally to Time Division Synchronous Code Division Multiple Access (TD-SCDMA) networks, and more particularly to methods and systems for optimization of cell selection in TD-SCDMA networks.

BACKGROUND

Mostly in TD-SCDMA networks, a UE is moved in an N-frequency scenario during connected mode, i.e., during Mobile Originating (MO) or Mobile Terminating (MT) circuit switch call and packet switch call. The serving cell measurements are done on the primary frequency, while the secondary frequencies are used for Down Link (DL) and Up Link (UL) data transfer. Additionally, a UE is assigned one secondary frequency for the data transfer. The N-frequency concept is used in TD-SCDMA networks to ensure less interference in the primary frequency. However, very high interference may be observed by the UEs in the secondary frequencies caused by the reuse of these secondary frequencies amongst the neighboring cells. This may result in drop of Downlink Physical Channel Signal to Noise Ratio (DPCH SNR), which further results in drop of Signal to Interference Ratio (SIR) beyond an acceptable threshold.

In conventional systems, this SIR drop may be overcome by selecting new serving cells. However, in TD-SCDMA networks, interference is not observed in the primary frequency, but in data slots of the secondary frequencies. Moreover, as new serving cell selection is made based on the primary frequency, the UE may end up selecting the current serving cell repeatedly. As a result, the UE is not able to select a new cell in order to resolve the issue of interference in the data slots. This further results in frequent call drops, thereby, impacting user experience.

SUMMARY

In one embodiment, a method of cell selection in a Time Division Synchronous Code Division Multiple Access (TD-SCDMA) communication network is disclosed. The method includes detecting, by an at least one processor, interference in a current serving cell employing a primary frequency and at least one secondary frequency used by a UE from at least one neighboring cell, wherein the interference is detected in the at least one secondary frequency of the current serving cell; including, by the at least one processor, the current serving cell in a defective cell list, wherein a signal strength associated with the primary frequency of the serving cell is greater than a signal strength associated with a neighboring primary frequency of the at least one neighboring cell; and excluding, by the at least one processor, each cell in the defective cell list from being selected as a new serving cell for the UE.

In another embodiment, a UE in a TD-SCDMA communication network is disclosed. The UE includes a processor configured to detect interference in a current serving cell employing a primary frequency and at least one secondary frequency used by a UE from at least one neighboring cell, wherein the interference is detected in the at least one secondary frequency of the current serving cell; include the current serving cell in a defective cell list, wherein a signal strength associated with the primary frequency of the serving cell is greater than a signal strength associated with a neighboring primary frequency of the at least one neighboring cell; and exclude each cell in the defective cell list from being selected as a new serving cell for the UE.

In yet another embodiment, a non-transitory computer-readable storage medium for cell selection in a TD-SCDMA communication network is disclosed, such that when executed by a computing device, the non-transitory computer-readable storage medium cause the computing device to detect interference in a current serving cell employing a primary frequency and at least one secondary frequency used by a UE from at least one neighboring cell, wherein the interference is detected in the at least one secondary frequency of the current serving cell; include the current serving cell in a defective cell list, wherein a signal strength associated with the primary frequency of the serving cell is greater than a signal strength associated with a neighboring primary frequency of the at least one neighboring cell; and exclude each cell in the defective cell list from being selected as a new serving cell for the UE.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
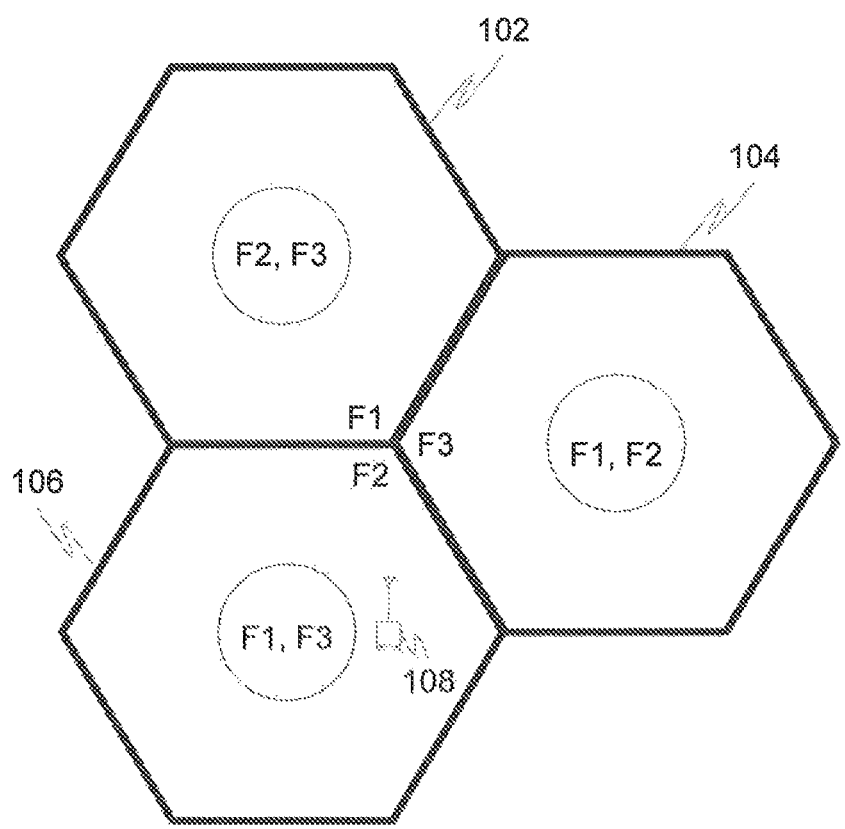
FIG. 1 illustrates an exemplary Time Division Synchronous Code Division Multiple Access (TD-SCDMA) network in which various embodiments may function.

Additional illustrative embodiments are listed below. In one embodiment, an exemplary Time Division Synchronous Code Division Multiple Access (TD-SCDMA) network 100 in which various embodiments may function is illustrated in FIG. 1. TD-SCDMA network 100 includes a cell 102, a cell 104, and a cell 106. Each of cell 102, cell 104, and cell 106 has a Base Station (BS) that manages communication between User Equipments (UEs) in their respective cells. It will apparent to a person skilled in the art that TD-SCDMA network 100 may include more than three cells. Examples of a UE may include but are not limited to a cell phone, a smart phone, a tablet, a phablet, and a laptop.

As TD-SCDMA network 100 is configured for N-frequency operation, each of cell 102, cell 104, and cell 106 is assigned one primary frequency and a plurality of secondary frequencies. This may be facilitated by re-use of three frequencies F1, F2, and F3. Alternatively, there may be no overlap between a set of available primary frequencies and a set of available secondary frequencies. A primary frequency is used for measurements of a serving cell and a secondary frequency is used for Down Link (DL) and Up Link (UL) data transfer. Cell 102 is assigned a primary frequency F1 and two secondary frequencies, i.e., F2 and F3. Similarly, cell 104 is assigned a primary frequency F3 and two secondary frequencies, i.e., F1 and F2. Cell 106 is assigned a primary frequency F2 and two secondary frequencies, i.e., F1 and F3. As each of cell 102, cell 104, and cell 106 are assigned different primary frequencies, i.e., F1, F2, and F3 respectively, there is no interference faced by UEs in each of these cells over primary frequencies. However, as the secondary frequencies are reused between these three cells, UEs may face interference over one or more of these secondary frequencies. For example, BS of cell 106 allocates F1 as secondary frequency to UE 108 served by cell 106. However, as F1 is also used as a secondary frequency in adjacent cell 104, UE 108 may face data slot interference while using the secondary frequency F1.

However, the selection for a new serving cell is made by identifying a primary frequency that has highest signal strength. The signal strength may be measured, for example, by using Received Signal Strength Indicator (RSSI) vales or Received Signal Code Power (RSCP) value. Moreover, amongst the primary frequencies, F1, F2, and F3, UE 108 may identify the primary frequency F2 as having the highest signal strength. Thus, UE 108 may end up selecting the current serving cell, i.e., cell 106 time and again. As a result, the issue of interference faced by UE 108 while using the secondary frequency F1 may not be resolved.

Figure 2:
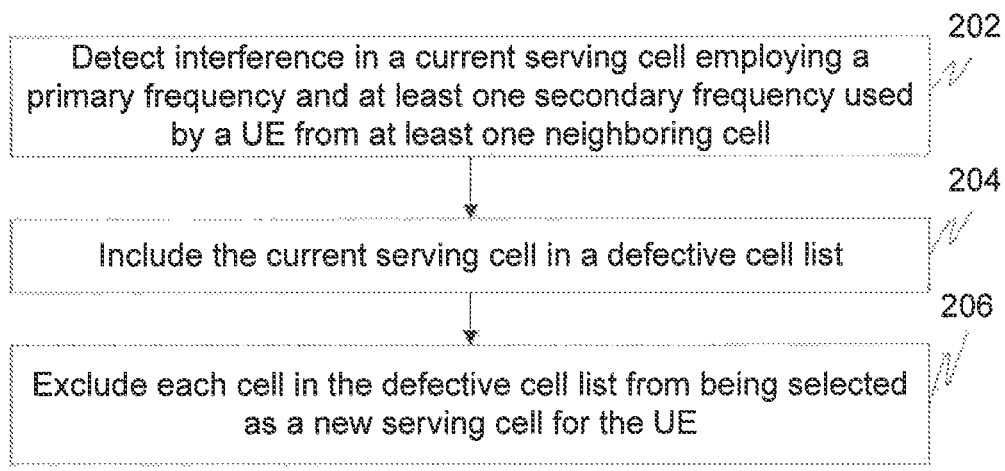
FIG. 2 illustrates a flowchart of a method of cell selection in a TD-SCDMA communication network, in accordance with an embodiment.

Referring now to FIG. 2, a flowchart of a method of cell selection in a TD-SCDMA communication network is illustrated, in accordance with an embodiment. At 202, a processor detects interference in a current serving cell employing a primary frequency and one or more secondary frequencies used by a UE from one or more neighboring cells. The processor may be a part of the UE that faces interference. The interference is detected in the one or more secondary frequencies of the current serving cell. The interference may be due to data slot interference. As a result of this interference, DPCH SIR may drop below a predefined threshold. For example, the serving cell for UE 108 is cell 106 and the neighboring cells are cell 102 and cell 104. UE 108 is allocated secondary frequency F1 to be used in cell 106. However, as secondary frequency F1 is used by UEs in cell 104, UE 108 detects interference in data slots of the secondary frequency F1.

After detecting the interference, the processor, at 204, includes the current serving cell in a defective cell list. In this case, the signal strength associated with the primary frequency of the serving cell is greater than the signal strength associated with neighboring primary frequencies assigned to the neighboring cells. For example, UE 108 may detect that signal strength of the primary frequency F2 assigned to its current serving cell, i.e., cell 106, is the highest amongst the primary frequencies F1 and F3 assigned to cell 102 and 104 respectively. Therefore, in this case, the processor includes cell 106 in a defective cell list.

Figure 3:
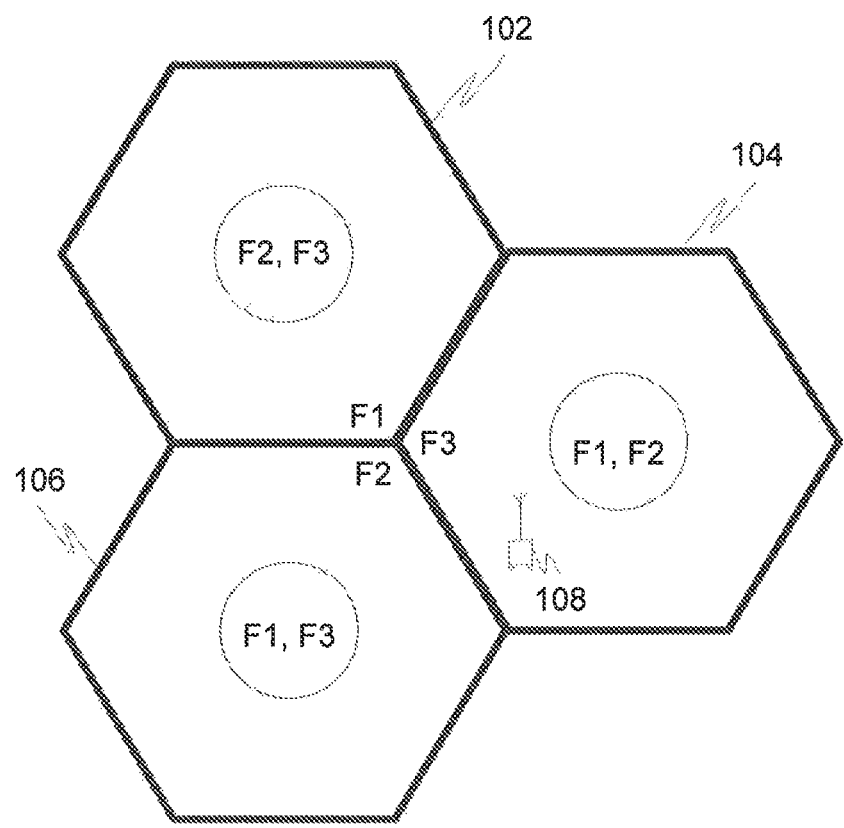
FIG. 3 illustrates selection of new serving cell by adding a current serving cell in a defective cell list, in accordance with an exemplary embodiment.

Thereafter, while searching for a new serving cell, the processor, at 206, excludes each cell in the defective cell list from being selected as a new serving cell for the UE. In other words, if a cell has been included in the defective cell list, the processor will not consider the primary frequency allocated to that cell while searching for a new serving cell. In continuation of the example given above, UE 108 may use the defective cell list to ignore the primary frequency F2 assigned to its serving cell 106, while searching for a new serving cell. Thus, UE 108 will only compare signal strength of the primary frequency F1 assigned to cell 102 and the primary frequency F2 assigned to cell 104. As the primary frequency F3 has higher signal strength when compared with the primary frequency F1, UE 108 selects cell 104 as its new serving cell. Thereafter, UE 108 uses the primary frequency F3 and one of the secondary frequencies F1 or F2. This has been depicted using FIG. 3, where UE 108 is served by cell 104 instead of cell 106. In an embodiment, the processor may exhaust a preferred frequency list before performing a full band scan. This is explained in detail in conjunction with FIG. 4.

The above cell selection method, where the current serving cell is included in a defective cell list, enables a faster selection of a suitable cell when interference is detected in secondary frequency used by the UE. As a result, the huge battery consumption of the UE while scanning for a suitable cell is reduced substantially. Additionally, there is a considerable improvement in some Key Performance Indices (KPIs). For example, call drops are significantly reduced and frequent expiring of Webpages is also avoided.

Figure 4:
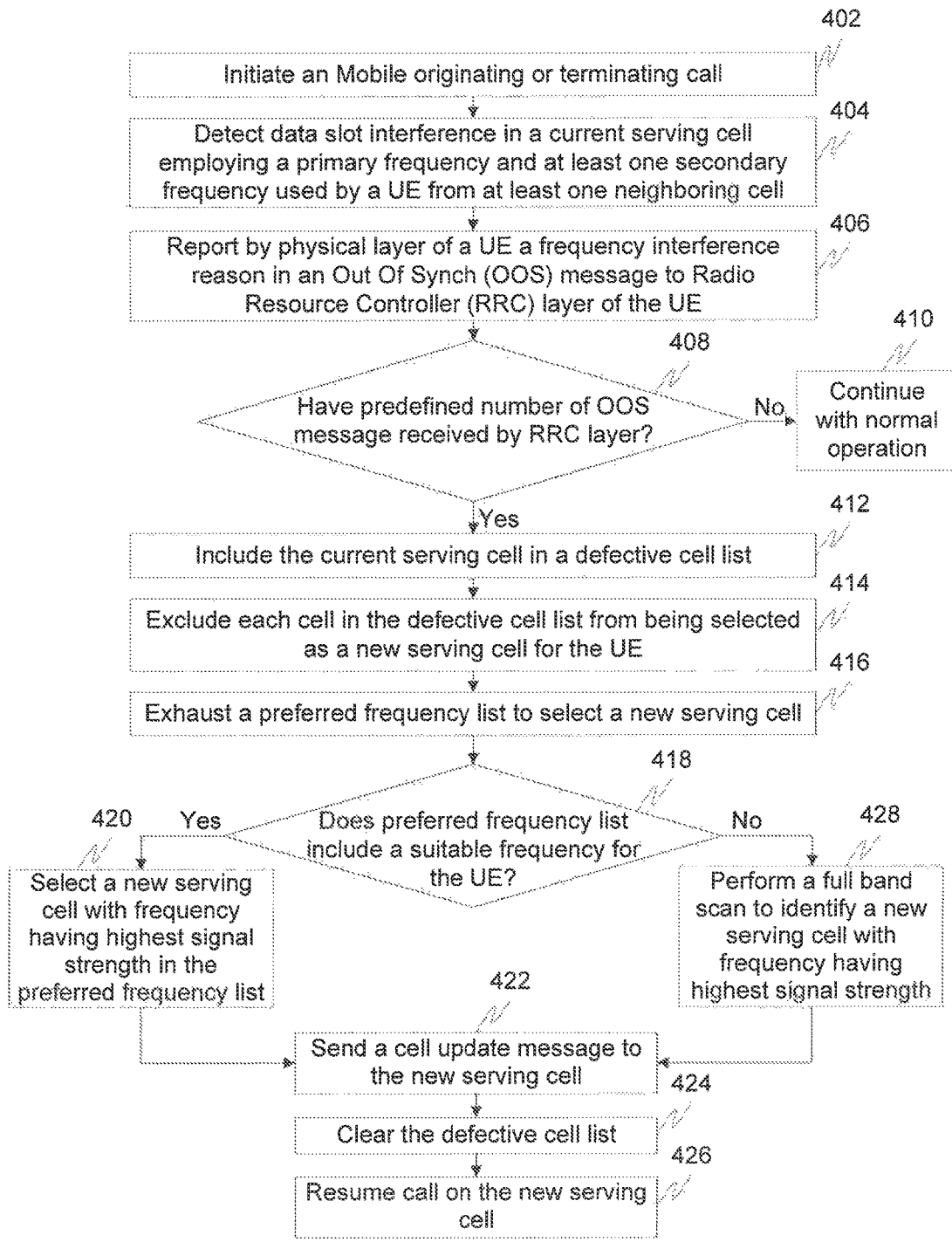
FIG. 4 illustrates a flowchart of a method of cell selection in a TD-SCDMA communication network, in accordance with another embodiment.

Referring now to FIG. 4, a flowchart of a method of cell selection in a TD-SCDMA communication network is illustrated, in accordance with another embodiment. A mobile originating or terminating call is initiated at 402. In a TD-SCDMA network, a UE can be moved in N-frequency even when the UE is in a connected mode. At 404, data slot interference is detected in a current serving cell employing a primary frequency and one or more secondary frequencies used by the UE from one or more neighboring cells. This has been explained in detail in conjunction with FIG. 2. When data slot interference is detected, physical layer of the UE, at 406, reports a frequency interference reason in an Out Of Synch (OOS) message to Radio Resource Controller (RRC) layer of the UE. The reason of frequency interference that is included in the OOS message is data slot interference.

At 408, a check is performed to determine, whether a predefined number of OOS messages have been received by the RRC layer of the UE. For the RRC layer to identify that a radio link failure has occurred, the predefined number of OOS messages is N313. Alternatively, the predefined number of OOS messages may be varied by system administrator to increase or decrease sensitivity of the UE. If the predefined number of OOS messages has not been received, the UE continues with normal operation at 410. However, referring back to 408, if the predefined number of OOS messages has been received, at 412, the UE includes the current serving cell in a defective cell list. At 414, while searching for a new serving cell, the UE excludes each cell in the defective cell list from being selected as a new serving cell for the UE. This has been explained in detail in conjunction with FIG. 2.

At 416, while searching for a new serving cell, the UE first exhausts a preferred frequency list before performing a full band scan to identify a primary frequency with the highest signal strength. The preferred frequency list includes one or more of frequencies received in measurement control, frequencies used in inter-frequency handover, and frequencies of cells detected in a preceding communication session. Each frequency in the preferred frequency list is associated with an aging timer, such that, a frequency for which the aging timer has expired, is removed from the preferred frequency list. Moreover, the preferred frequency list is updated after a predefined time interval, in order to include new frequencies in the list and to keep the preferred frequency list up to date.

In some embodiments, list should be updated whenever UE will receive new frequency to measure in measurement control message or when UE will perform a interfrequency hand over or when UE will detects strong new cell during measurement process. List will be updated dynamically whenever it will detect some new frequency from above sources. And aging timer will start from the time it added in list.

To this end, the UE at 418 performs a check to determine whether the preferred frequency list includes any suitable primary frequency for the UE. A frequency is considered to be unsuitable, when it has low signal strength. If the preferred frequency list includes one or more suitable frequencies, the UE, at 420 selects a new serving cell that is assigned the frequency having the highest signal strength in the preferred frequency list. Thereafter, at 422, the UE sends a cell update message to a BS of the new serving cell. The cell update message includes radio link failure as the reason of the cell update. At 424, the UE clears the defective cell list. In other words, the serving cell that was included in the defective cell list is removed from that list by the UE. Clearing of the defective cell list avoids a scenario where the UE permanently ignores the previous serving cells. After selection of the new serving cell, the UE, at 422, resumes the mobile originating or terminating call on the new serving cell. Referring back to 418, if the preferred frequency list does not include any suitable frequency, the UE, at 428, performs a full band scan to identify a new serving cell with frequency that has the highest signal strength. Thereafter, UE performs 422, 424, and 426 in sequence.

The above cell selection method, where the current serving cell is included in a defective cell list, enables a faster selection of a suitable cell when interference is detected in secondary frequency used by the UE. Moreover, exhausting the preferred frequency list, before doing a full band scan, further makes the cell selection process more efficient. As a result, the huge battery consumption of the UE while scanning for a suitable cell is reduced substantially. Additionally, there is a considerable improvement in some Key Performance Indices (KPIs). For example, call drops are significantly reduced and frequent expiring of Webpages is also avoided.

Figure 5:
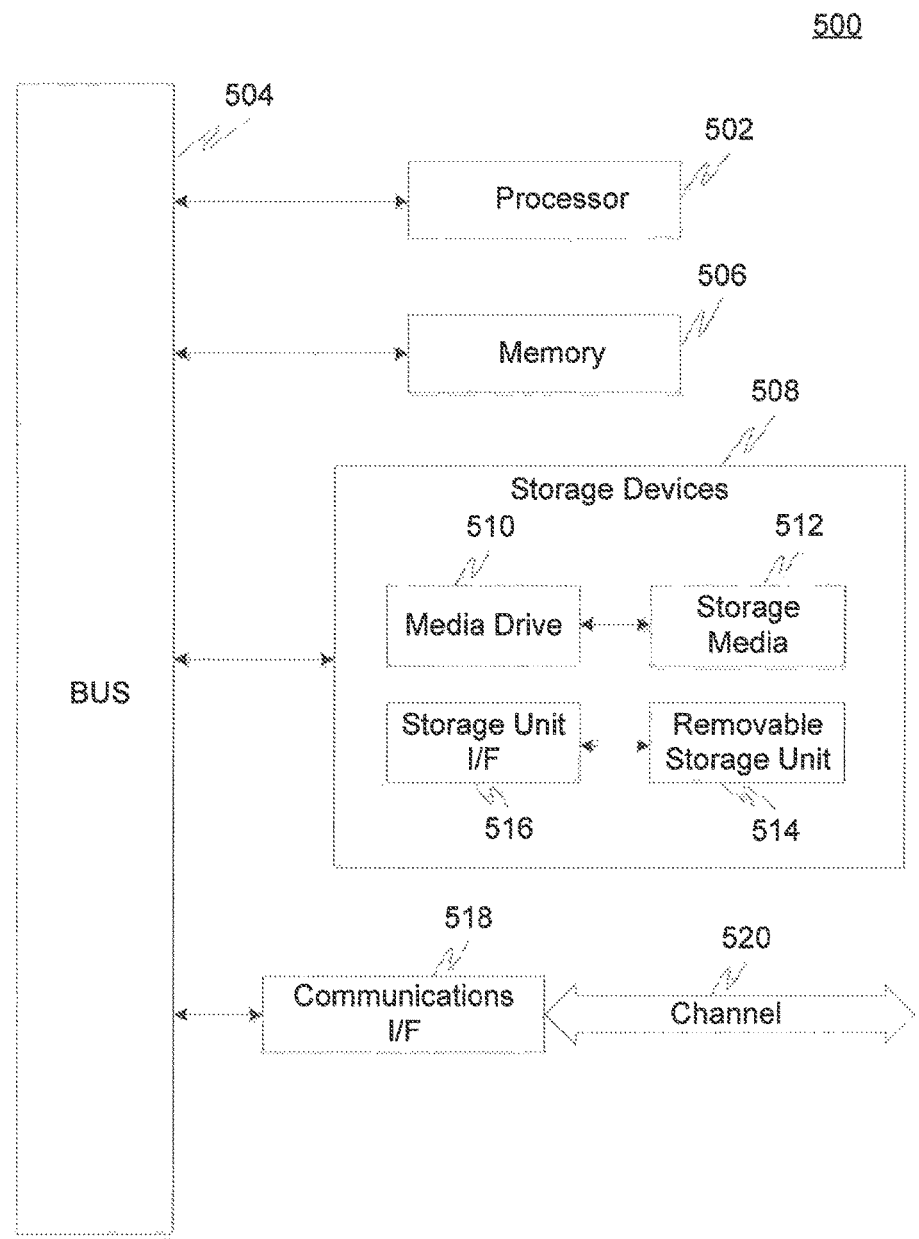
FIG. 5 illustrates an exemplary computing system that may be employed to implement processing functionality for various embodiments.

FIG. 5 illustrates an exemplary computing system 500 that may be employed to implement processing functionality for various embodiments (e.g., as a SIMD device, client device, server device, one or more processors, or the like). Those skilled in the relevant art will also recognize how to implement the invention using other computer systems or architectures. Computing system 500 may represent, for example, a user device such as a desktop, an activity monitoring device, a wearable portable electronic device, a mobile phone, personal entertainment device, DVR, and so on, or any other type of special or general purpose computing device as may be desirable or appropriate for a given application or environment. Computing system 500 can include one or more processors, such as a processor 502 that can be implemented using a general or special purpose processing engine such as, for example, a microprocessor, microcontroller or other control logic. In this example, processor 502 is connected to a bus 504 or other communication medium.

Computing system 500 can also include a memory 506 (main memory), for example, Random Access Memory (RAM) or other dynamic memory, for storing information and instructions to be executed by processor 502. Memory 506 also may be used for storing temporary variables or other intermediate information during execution of instructions to be executed by processor 502. Computing system 500 may likewise include a read only memory ("ROM") or other static storage device coupled to bus 504 for storing static information and instructions for processor 502.

Computing system 500 may also include storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by media drive 510. As these examples illustrate, storage media 512 may include a computer-readable storage medium having stored therein particular computer software or data.

In alternative embodiments, storage devices 508 may include other similar instrumentalities for allowing computer programs or other instructions or data to be loaded into computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from removable storage unit 514 to computing system 500.

Computing system 500 can also include a communications interface 518. Communications interface 518 can be used to allow software and data to be transferred between computing system 500 and external devices. Examples of communications interface 518 can include a network interface (such as an Ethernet or other NIC card), a communications port (such as for example, a USB port, a micro USB port), Near field Communication (NFC), etc. Software and data transferred via communications interface 518 are in the form of signals which can be electronic, electromagnetic, optical, or other signals capable of being received by communications interface 518. These signals are provided to communications interface 518 via a channel 520. Channel 520 may carry signals and may be implemented using a wireless medium, wire or cable, fiber optics, or other communications medium. Some examples of channel 520 include a phone line, a cellular phone link, an RF link, a Bluetooth link, a network interface, a local or wide area network, and other communications channels.

In this document, the terms "computer program product" and "computer-readable medium" may be used generally to refer to media such as, for example, memory 506, storage devices 508, removable storage unit 514, or signal(s) on channel 520. These and other forms of computer-readable media may be involved in providing one or more sequences of one or more instructions to processor 502 for execution. Such instructions, generally referred to as "computer program code" (which may be grouped in the form of computer programs or other groupings), when executed, enable computing system 500 to perform features or functions of embodiments of the present invention.

In an embodiment where the elements are implemented using software, the software may be stored in a computer-readable medium and loaded into computing system 500 using, for example, removable storage unit 514, media drive 510 or communications interface 518. The control logic (in this example, software instructions or computer program code), when executed by processor 502, causes processor 502 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for optimization of cell selection in TD-SCDMA networks. The cell selection method, where the current serving cell is included in a defective cell list, enables a faster selection of a suitable cell when interference is detected in secondary frequency used by the UE. Moreover, exhausting the preferred frequency list, before doing a full band scan, further makes the cell selection process more efficient. As a result, the huge battery consumption of the UE while scanning for a suitable cell is reduced substantially. Additionally, there is a considerable improvement in some Key Performance Indices (KPIs). For example, call drops are significantly reduced and frequent expiring of Webpages is also avoided.

The specification has described methods and systems for optimization of cell selection in TD-SCDMA networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of cell selection in a Time Division Synchronous Code Division Multiple Access (TD-SCDMA) communication network, the method comprising:
   detecting, by at least one processor of a User Equipment (UE), interference in a current serving cell employing a primary frequency and at least one secondary frequency used by the UE from at least one neighboring cell, wherein the interference is detected in the at least one secondary frequency of the current serving cell;
   sending, by the at least one processor of the UE, Out Of Synch (OOS) message to Radio Resource Controller (RRC) layer of the UE based on the interference detected in the at least one secondary frequency of the current serving cell;
   including, by the at least one processor of the UE, the current serving cell in a defective cell list based on reception of predefined number of OOS messages, even when the UE is in connected mode to the current serving cell, wherein a signal strength associated with the primary frequency of the current serving cell is greater than a signal strength associated with a neighboring primary frequency of the at least one neighboring cell;
   excluding, by the at least one processor of the UE, the current serving cell in the defective cell list from being selected as a new serving cell for the UE; and
   performing, by the at least one processor of the UE, cell selection from the at least one neighboring cell to allocate a new primary frequency and a new secondary frequency to the UE in the current serving cell, wherein the new primary frequency and the new secondary frequency are allocated from a new serving cell other than the excluded current serving cell in the defective cell list.

2. The method of claim 1, wherein the interference in the at least one secondary frequency comprises data slot interference.

3. The method of claim 1, further comprising reporting by physical layer of a UE frequency interference reason for sending the OOS messages to the RRC layer of the UE.

4. The method of claim 1, further comprising selecting the new serving cell for the UE from amongst the at least one neighboring cell after detecting the interference, the new serving cell comprising a primary frequency with highest signal strength amongst primary frequencies allocated to the at least one neighboring cell.

5. The method of claim 4, further comprising sending a cell update message to the new serving cell, the cell update message comprising radio link failure as cell update reason.

6. The method of claim 4, further comprising creating a preferred frequency list comprising at least one of frequencies received in measurement control, frequencies used in inter-frequency handover, and frequencies of cells detected in a preceding communication session.

7. The method of claim 6, wherein selecting the new serving cell for the UE comprises exhausting the preferred frequency list before performing a full band scan.

8. The method of claim 7, wherein the preferred frequency list is exhausted when frequencies in the list of the preferred frequency list are unsuitable for communication by the UE.

9. The method of claim 6, wherein each frequency in the preferred frequency list is associated with an aging timer, a frequency with expired aging timer being removed from the preferred frequency list.

10. The method of claim 1, further comprising clearing the defective cell list after selecting the new serving cell for the UE.

11. An User Equipment (UE) in a Time Division Synchronous Code Division Multiple Access (TD-SCDMA) communication network, the UE comprising: a processor configured to:
    detect interference in a current serving cell employing a primary frequency and at least one secondary frequency used by the UE from at least one neighboring cell, wherein the interference is detected in the at least one secondary frequency of the current serving cell;
    send Out Of Synch (OOS) message to Radio Resource Controller (RRC) layer of the UE based on the interference detected in the at least one secondary frequency of the current serving cell;
    include the current serving cell in a defective cell list based on reception of predefined number of OOS messages, even when the UE is in connected mode to the current serving cell, wherein a signal strength associated with the primary frequency of the current serving cell is greater than a signal strength associated with a neighboring primary frequency of the at least one neighboring cell;
    exclude the current serving cell in the defective cell list from being selected as a new serving cell for the UE; and
    perform cell selection from the at least one neighboring cell to allocate a new primary frequency and a new secondary frequency to the UE in the current serving cell, wherein the new primary frequency and the new secondary frequency are allocated from a new serving cell other than the excluded current serving cell in the defective cell list.

12. The UE of claim 11, wherein the processor is further configured to report via physical layer of the UE, a frequency interference reason for sending the OOS messages to the RRC layer of the UE.

13. The UE of claim 11, wherein the processor is further configured to select the new serving cell for the UE from amongst the at least one neighboring cell after detecting the interference, the new serving cell comprising a primary frequency with highest signal strength amongst primary frequencies allocated to the at least one neighboring cell.

14. The UE of claim 13, wherein the processor is further configured to send a cell update message to the new serving cell, the cell update message comprising radio link failure as cell update reason.

15. The UE of claim 13, wherein the processor is further configured to create a preferred frequency list comprising at least one of frequencies received in measurement control, frequencies used in inter-frequency handover, and frequencies of cells detected in a preceding communication session.

16. The UE of claim 15, wherein the selecting the new serving cell for the UE comprises exhausting the preferred frequency list before performing a full band scan.

17. The UE of claim 16, wherein the preferred frequency list is exhausted when frequencies in the list of the preferred frequency list are unsuitable for communication by the UE.

18. The UE of claim 15, wherein each frequency in the preferred frequency list is associated with an aging timer, a frequency with expired aging timer being removed from the preferred frequency list.

19. The UE of claim 11, wherein the processor is further configured to clear the defective cell list after selecting the new serving cell for the UE.

20. A non-transitory computer-readable storage medium storing instructions for cell selection in a Time Division Synchronous Code Division Multiple Access (TD-SCDMA) communication network, when executed by a User Equipment (UE), cause the UE to:
    detect interference in a current serving cell employing a primary frequency and at least one secondary frequency used by a UE from at least one neighboring cell, wherein the interference is detected in the at least one secondary frequency of the current serving cell;
    send Out Of Synch (OOS) message to Radio Resource Controller (RRC) layer of the UE based on the interference detected in the at least one secondary frequency of the current serving cell;
    include the current serving cell in a defective cell list based on reception of predefined number of OOS messages, even when the UE is in connected mode to the current serving cell, wherein a signal strength associated with the primary frequency of the current serving cell is greater than a signal strength associated with a neighboring primary frequency of the at least one neighboring cell;
    exclude the current serving cell in the defective cell list from being selected as a new serving cell for the UE; and
    perform cell selection from the at least one neighboring cell to allocate a new primary frequency and a new secondary frequency to the UE in the current serving cell, wherein the new primary frequency and the new secondary frequency are allocated from a new serving cell other than the excluded current serving cell in the defective cell list.

* * * * *